Dec. 25, 1923.

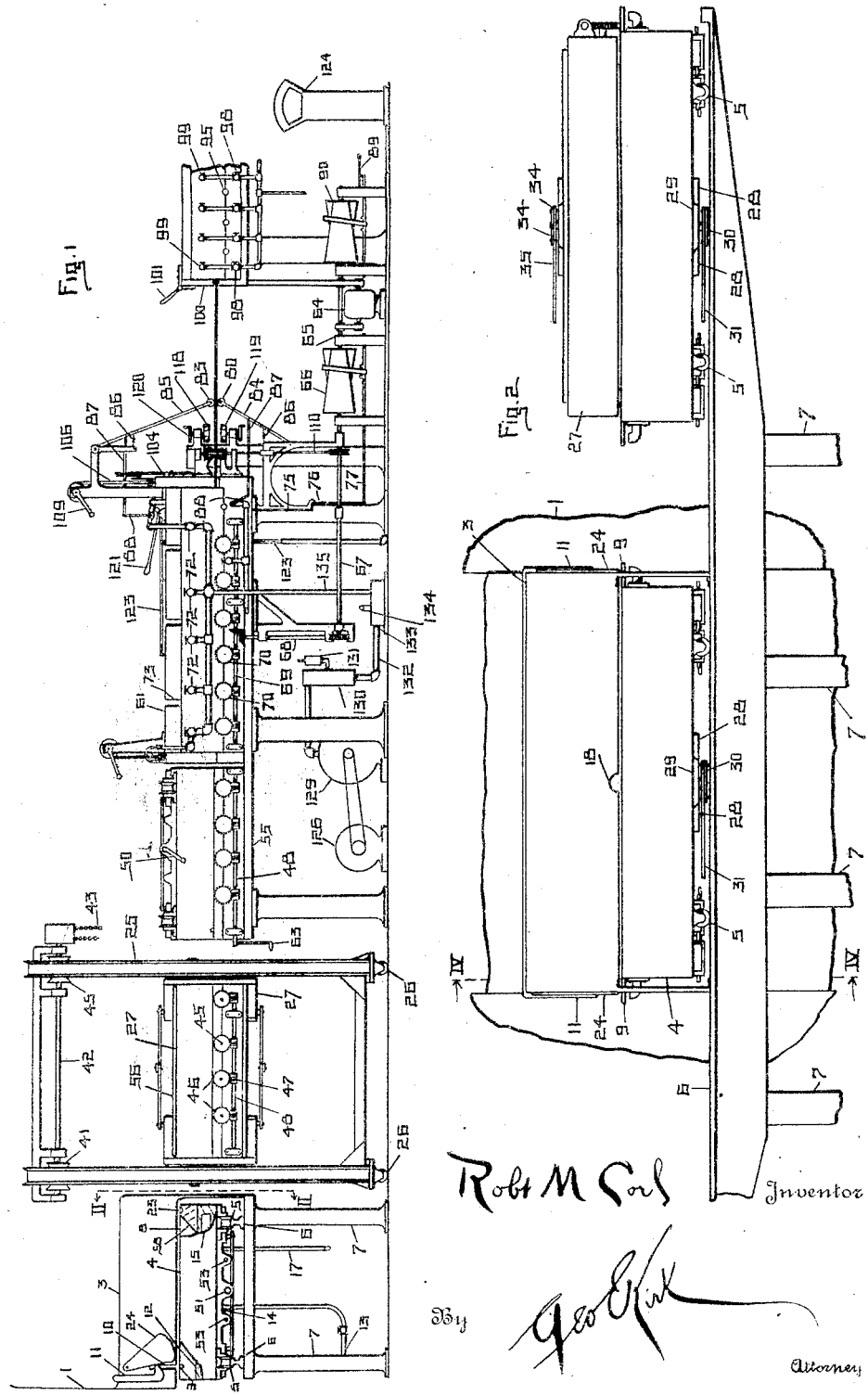

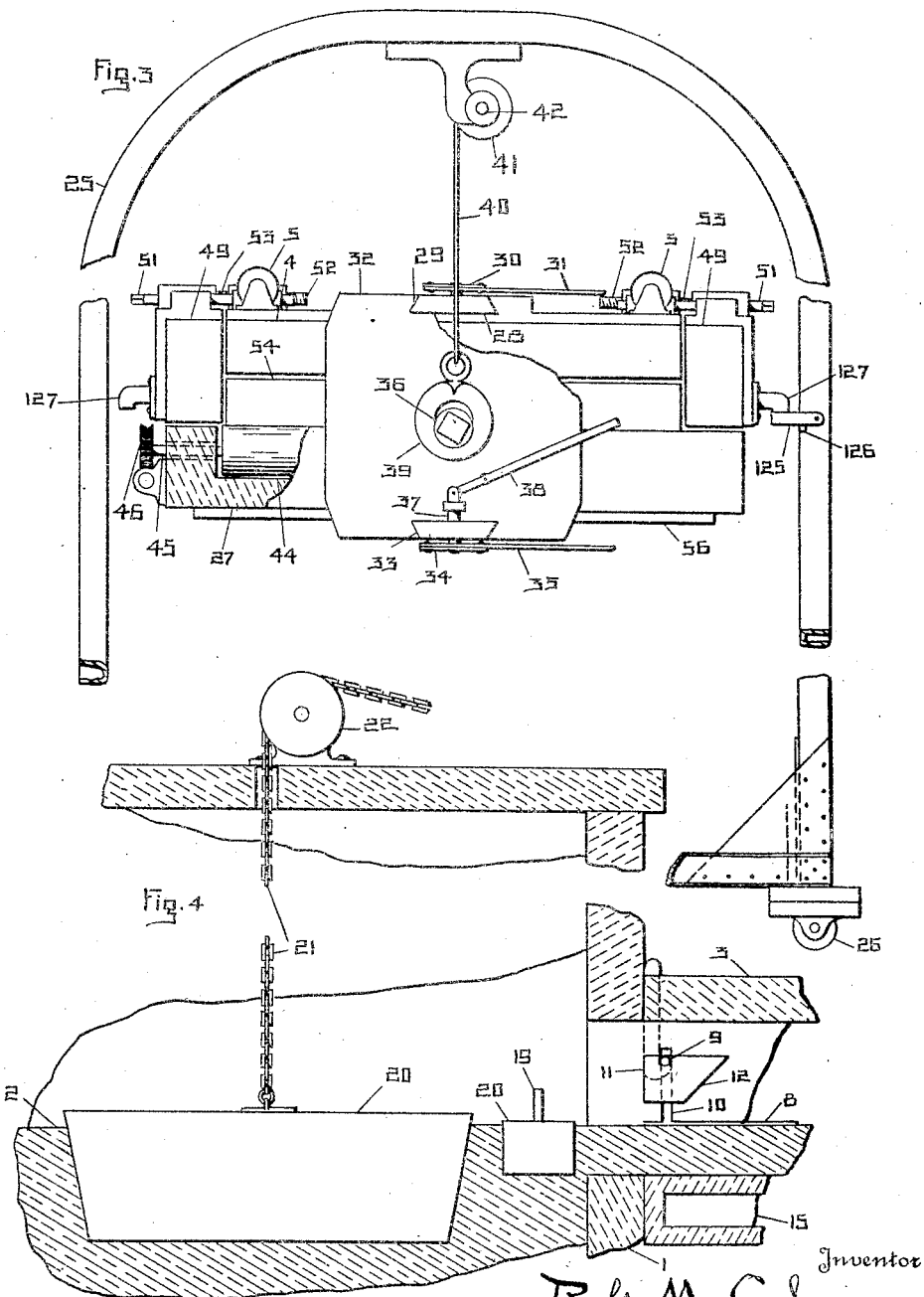

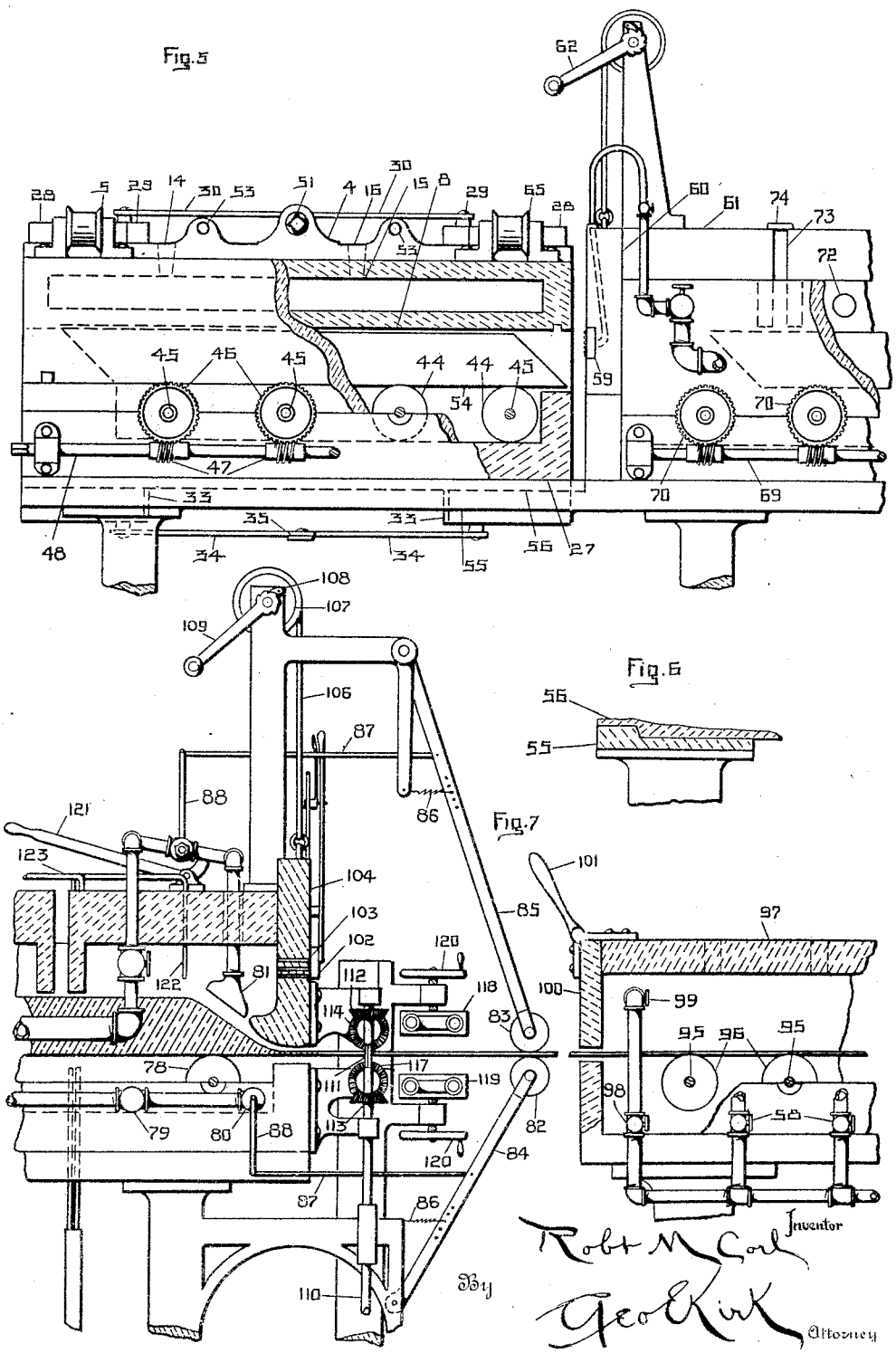

R. M. CORL 1,478,554

GLASS MANUFACTURE

Filed April 21, 1917  4 Sheets-Sheet 4

Robt M Corl
Inventor

By Geo E Kirk
Attorney

Patented Dec. 25, 1923.

1,478,554

UNITED STATES PATENT OFFICE.

ROBERT M. CORL, OF MAUMEE, OHIO, ASSIGNOR, BY MESNE ASSIGNMENTS, TO ERIE GLASS COMPANY, OF TOLEDO, OHIO, A CORPORATION OF DELAWARE.

GLASS MANUFACTURE.

Application filed April 21, 1917. Serial No. 163,569.

*To all whom it may concern:*

Be it known that I, ROBERT M. CORL, a citizen of the United States of America, residing at Maumee, Lucas County, Ohio, have invented new and useful Glass Manufacture, of which the following is a specification.

This invention relates to the flow or reflow formation of material.

This invention has utility in the manufacture of glass, especially sheets for continuous production.

Claims covering broadly certain features of the invention herein disclosed are made in my copending application Serial No. 232,841, filed May 6, 1918.

Referring to the drawings:

Fig. 1 is a side elevation with parts broken away of an embodiment of the invention in a sheet glass installation;

Fig. 2 is a fragmentary view on the line II—II, Fig. 1;

Fig. 3 is a fragmentary side elevation of the crane of Fig. 1;

Fig. 4 is a fragmentary view on the line IV—IV, Fig. 2;

Fig. 5 is a fragmentary side elevation of the apparatus showing the mold in position for making delivery to the converter;

Fig. 6 is a fragmentary detail of the guide for aligning the mold carrier as to the converter;

Fig. 7 is a fragmentary side elevation of the delivery end of the converter for position adjacent the leer;

Figure 8:
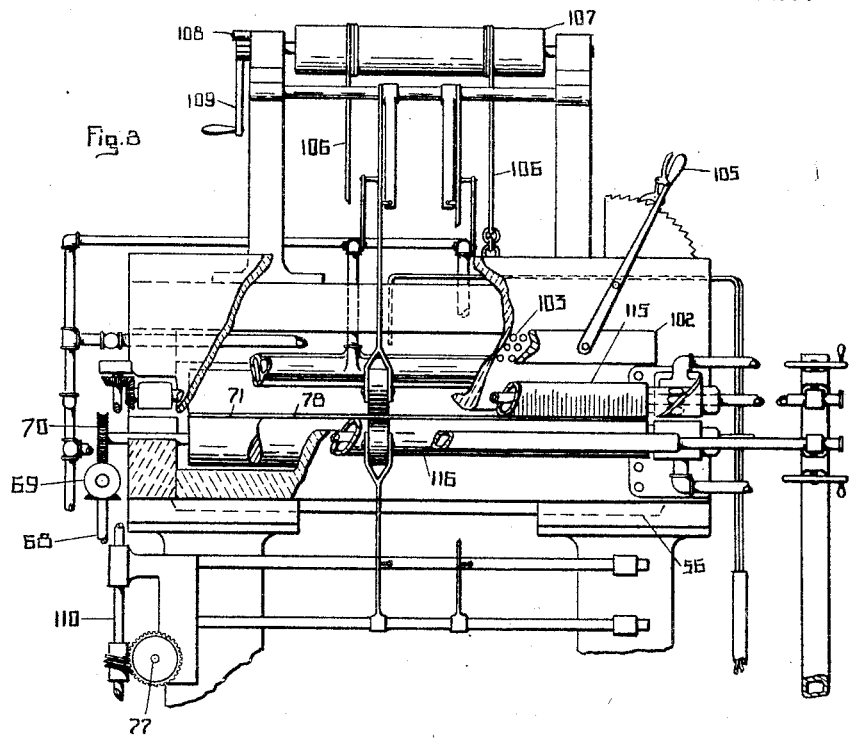
Fig. 8 is a fragmentary elevation of the delivery end of the converter.

The device of this disclosure may be installed as a glass plant having the source of molten material supply as the tank 1 containing the molten metal or fluid glass 2. This tank has in communication therewith the overhanging hood or dog house 3 under which may be run the mold carrier or car 4 provided with the wheels 5 mounted on the track 6 carried upon uprights 7.

For flowing material into the mold 8 of the carrier 4, the ends of bar 9 may be lifted as permitted by the slots 10 to engage the hooks 11 and thereby lift the mold end closure 12 for opening the mold 8. During this operation the water supply line 13 may have a friction held plug inserted in the opening 14 for supplying water circulation to the chamber 15, the flow from which is permitted at the removable plug 16 to the waste line 17. This maintains a chilling or cooling for the mold carrier.

A tool may be inserted through the front opening 18, (Fig. 2) in the dog house 3 to engage the eye 19 (Fig. 4) of the dam 20 for pushing this dam into the body of the molten glass 2 in the tank 1 where it may float and act as a skimmer for the metal flowing into the mold 8.

That the skimmed molten glass in the mold 8 may have a full charge, the float 20' may be lowered by the chain 21 passing over the pulley 22 for raising the level of the glass 2 in filling the mold 8. With the mold filled, the dam 20 may have its eye 19 engaged by the tool through the opening 18 and drawn back to a holding or damming position between the tank 1 and the dog house 3. The hooks 11 may be rocked to release the bar 9 and thus allow the closure 12 to settle into damming position in the mold 8 adjacent the dam 20. This may overflow the material from the mold 8, say into the spillway 23 (Fig. 1).

With the mold thus filled and the bar 9 dropped, the shutters 24 may be swung into position for closing the slots 10. The upper surface of the cast in the mold 8 is accordingly fire finished. A partial chill or body is given the mass of molten or semi-molten glass. The water circulation through the cooler 15 may be disconnected by shutting off the water from line 13 and pulling the plugs 14, 16. The car 4 may be pushed along the track 6 to an overhang position out from the dog house.

With this mode of operation there may be casts running in the molds from the tank at all times to supply a plurality of sources for re-forming or using the supply all from a common tank.

The car or carrier 4 upon the overhang has moved thereover the traveling crane 25 freely movable as desired upon the rollers 26, as inward toward the dog house after spanning the projecting overhanging end of the track 6.

This traveling crane may bring into position for dropping over the top of the carrier 4 the charger 27. The carrier 4 has in its lower side the bevel guides 28 for the dove-tail plungers 29, (Figs. 1, 2, 3, 10) which may be operated by the links 30 and bar 31 for movement outward to have the dove-tails 29 engage the embracing plates 32 while the charger 27 may have its dove-tail wedges 33 thrown by links 34 from the handle 35 also to engage in this pair of plates 32. This action in locking the plates 32 mounts the carrier 4 and the charger 27 together as a unit with the trunnions 36 extending from the plates 32. This locking of the plates 32 to the charger 27 may be anchored against accidental release by the plunger 37 moved by the handle 38 into the dove-tail plunger 33.

Eyes 39 may embrace the trunnions 36 and through cables 40 about drums 41 mounted on the shaft 42 be operated by the chain fall 43 in lifting the charger and carrier as a unit from the track 6. When free of the track, the crane may be moved away from the position thereover. By mounting a crank on the squared end of the trunnion 36, the carrier and charger may be oriented 180° positioning the carrier on top and the charger beneath, thus bringing the fire finished surface of the mass of material supply below and against the rollers 44 in the carrier 27, which rollers 44 are mounted on the shafts 45 carrying worms 46 coacting with worms 47 on the shaft 48.

With this fire finished face from the cast of the mold against the rollers 44, the sides 49 of the carrier 4 may be moved outward by operating the crank 50 upon each of the squared end shafts 51 operable through the screw threads 52 to urge the sides 49 away from the central body carrier 4, this urging being in parallel lines as guided by the rods 53.

While the filling of the carrier 4 is definite as to amount, this releasing of the sides 49 is more a freeing of the partially cooled mass 54 of glass so that it is loose in position on the rolls 44 and may settle slightly away from the carrier 4. The crane may be shifted to bring the carrier 27 over the way 55 having the wedge guides 56 on the lower portion of the carrier 27 serving to center this carrier 27 as to the converter.

With the carrier charger in position adjacent the converter, the fall 43 is worked to settle the charger 27 into position, the bolts 37 are withdrawn permitting removal of the plates 32 after the plungers 33 and 29 are also retracted. With this charger 27 thus aligned in position adjacent the converter, the end 58 of the mold 8 being removed from its interfitting seat before the clearance precludes, it is now proper to heat the downwardly inclined forward face of the cast 54 say from the burner 59 in the door 60 of the converter housing 61.

When this burner 59 has sufficiently warmed the forward face of this cast 54, the handle 62 may be operated to lift the door 60 and then crank 63 on the squared end of the shaft 48 (Figs. 1, 5) operated to manually propel the charge 54 into the converter 61. Normally this manual impelling of the charge into the converter would be of a portion of material 54 which could be actuated to be fully housed at once in the converter 61 with its inclined forward end at once fused into a unit with the overhanging end of the preceding charge in the converter to result in a continuous material supply in the converter.

Figure 9:
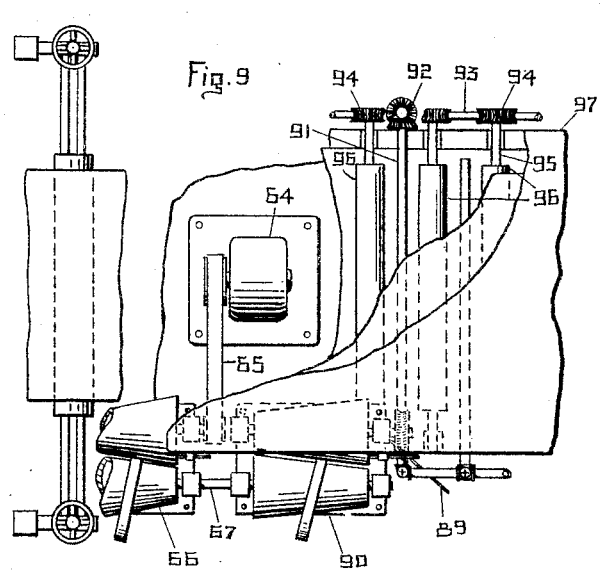
Fig. 9 is a fragmentary plan view of the leer and converter driving means.
Figure 10:
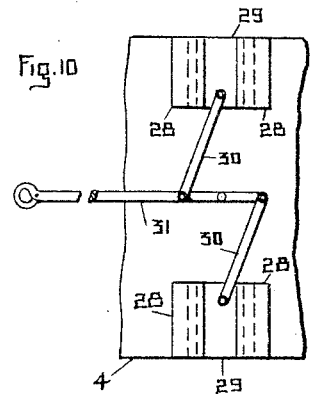
Fig. 10 is a fragmentary bottom plan view of the mold carrier.

The motor 64 (Figs. 1, 9) may be connected by belt 65 to the variable speed driving mechanism 66 to actuate the shaft 67 through speed reduction gearing for operating the shafts 68, 69, and through worm wheels 70 operate rolls 71 in the converter housing 61 thereby providing a positive slow feed drive for impelling the charge of still heated glass forward.

The heat of this glass may be maintained and gradually brought up by controllable burners 72. The circulation or draft toward the converter may be through baffle wall openings 73 and further regulation may occur by placing closures 74 over such draft or vent openings.

Expansible bar 75 extending into the converter (Fig. 1) may operate through the bell crank 76 and shift bar 77 to vary the speed of the variable speed drive 66, thereby controlling the feed rate of the material automatically through the converter. With this heated material progressing toward the dischage end of the converter, it may ride over the idle roller 78 and have its lower portion warmed from burner 79, 80, while its upper portion is caused to flow down by the burner 81.

The terminal burners 80, 81, may be controlled by the rolls 82, 83, connected by arms 84, 85, normally acted upon by springs 86. From these arms extend the links 87 to valve levers 88. Accordingly, when the mass of the sheet glass passing between the rollers 82, 83, is increased, these levers may operate to increase the action of the burners 80, 81, thereby rendering the flow more fluid for a thinner sheet flow.

This thinner sheet flow may be taken into account by adjusting the lever 89, (Figs. 1, 9) of the variable speed drive 90 for increasing the driving of the shafts 91, 92, 93, in actuating through the worm wheels 94 and shaft 95 carrying the rolls 96 in the leer 97, so that the more fluid stock may be handled at an increased rate.

The temperature in the leer 97 may be controlled by burners 98, 99, as desired. Access to the leer 97 may be obtained by opening the door 100, say by handle 101.

Draft adjacent the burner 81 may be controlled by shifting the plate 102 as to orifices 103 in the door 104. This shifting of this shutter 102 (Figs. 7, 8) may be through the hand lever 105.

The position of the door 104 for clearance as to the sheet of formed glass passing thereunder may be adjusted by the cables 106 (Figs. 1, 7, 8) to the drum 107 as locked by the dog 108. Shiftings of the door 104 may occur through operation of handle 109.

Actuated from the shaft 67 by worm speed reduction is the shaft 110 having the slip extension connector 111 permitting the bevel gear 112 carried upon the door 104 to be driven with the shaft 110 notwithshanding it may be axially shifted therealong. Opposing this bevel gear 112 is the bevel gear 113. The bevel gear 112 through the bevel gear 114 may actuate the figure roll 115 for impressing a design upon the sheet of glass passing from the converter 61, should it be desired to have a design thereon. To hold the glass in position adjacent roll 115 should it not be desired to have a figure, on the opposite side may be disposed the smooth roll 116 actuated by the gear 117 from the bevel gear 113.

The body of the mass from the glass supply, notwithstanding the flow off therefrom, may be such as to retain a form. This, according to the thickness of the sheet being formed, may not need a support at the figure roll portion. However, that this body formation may be accelerated immediately following the flowing off, the water circulation cooling chambers 118, 119, are disposed upon opposite sides of this delivery of heated sheet glass, each of these chambers having water circulation therethrough at a controllable rate and further, being adjustable by hand wheels 120 into such proximity with the formed glass as may be desirable for the thickness of sheet and its rate of delivery.

That there may be adjustment for the flow off action of the burner 81 not only as to its intensity but as to its position, there is provided the handle 121 (Fig. 7) rockable to raise or lower the burner 81. This adjustment is especially desirable in baiting through the initial draw for starting the machine in its continuous operation.

As a guide of the temperature conditions throughout the converter, which converter may be of a length as found desirable for the nature of metal used, the thickness of the ingot and cast used as well as the finished product produced, thermo-electric couples 122 may be variously placed throughout the housing and connected by leads 123 to give pyrometric readings at the instrument 124 as desired.

With the crane 25 in position over the way 55, the arms 125 pivoted on the uprights of the crane 25 may be swung horizontally against the stops 126 so that in lowering the carrier 4, the lugs 127 of such carrier may support the carrier. Then upon drawing the plungers 29, the plates 32 through the trunnions 36 may definitely guide the charger 27 into its position on the way 55 with sufficient clearance as to the carrier 4 that the end 58 of the mold may be removed from its interlocked position. The carrier and charger separately or together may then be brought into the desired relation as to the converter 61.

The motor 128 (Fig. 1) serves to drive the blower 129 for maintaining an air pressure in the tank 130 having the regulator 131. This compressed air from the tank 130 may pass by the pipe 132 to the carbureter 133 supplied by the fuel line 134 to provide combustible for the converter burners through the pipe 135.

It will be understood that while I have illustrated one form of means which is operable to take glass from a molten source of supply and add it to the rear end of the set mass to maintain the continuity of flow from its forward end, I do not wish to be limited thereto as the glass may be supplied from the molten source either in ingot or continuous column form to the mass from which the sheet-flow is taking place without departing from the spirit of the invention and claims.

What is claimed and it is desired to secure by Letters Patent is:

1. The process of making sheet glass from a mass, which comprises applying heat to two surface portions of the mass, flowing off the glass, as heated at the surface portions, to form the two faces of a sheet of glass, and governing the heat applied to each surface portion by the position of the face of the sheet being formed therefrom.

2. In combination, means for advancing a set mass of glass, means for applying a converting heat to the forward end portion of the mass to flow therefrom a sheet of lesser thickness than the mass, means for carrying away the sheet as it flows from the mass, and means acted on by the sheet to regulate the heating means to maintain a substantially uniform flow of glass from the mass.

3. In apparatus for flowing a sheet from a mass of glass, the combination of two parallel heating devices for heating the sources of flow from the mass of the two faces of the sheet, and an independant automatic means for governing each of the heating devices.

4. In apparatus for flowing a sheet from a mass of glass, the combination of two parallel heating devices for heating the sources of flow from the mass of the two faces of the sheet, and an independent automatic means for governing each of the heating devices in accordance with the position of the sheet face flowing from the source heated by that device.

5. In combination, means for advancing a set mass of glass, means for applying a converting heat to the forward end portion of the mass to flow therefrom a sheet of lesser thickness than the mass, means for carrying away the sheet as it flows from the mass, means acted on by the sheet to regulate the heating means to maintain a substantially uniform flow of glass from the mass, and means for supplying glass to the rear end of the mass to maintain its continuity and the continuity of flow of glass therefrom.

6. In combination, means for applying heat to the forward end of a set mass of glass to flow therefrom a sheet of lesser thickness than the mass, and thermally controlled means for advancing the mass at a speed proportioned to the temperature of the heat applied to the mass.

7. In combination, a heated chamber, means for advancing a set mass of glass through said chamber, means for applying a converting heat to the mass within the chamber to flow from an edge portion of the mass a sheet of lesser thickness than the mass, and means for advancing the mass in the direction of flow of the sheet therefrom and regulated as to speed by the temperature within the chamber.

8. In combination, a chamber having an outlet opening at one end, means within the chamber for supporting a set mass of glass, means within the chamber for applying melting heat to the glass, the supporting and heating means being in such relation that the molten glass may pass from the set mass through the opening, and a gate for regulating the size of the opening.

9. In combination, a chamber having an outlet opening at one end, means for moving a set mass of glass in the chamber towards the opening, heating means adapted to soften the glass as it advances and to melt the end of the mass next the opening, the heating means being in such relation to the opening that the molten glass may pass from the mass through the opening, and an adjustable gate forming one side of the opening.

10. In combination, a chamber having an elongated rectangular opening at one end, means within the chamber for supporting and progressing towards the opening a set mass of glass rectangular in cross-section, heating means adapted to soften the mass as it advances and to melt the end of the mass next the opening, the supporting and heating means being in such relation to the opening that the molten glass may flow in sheet form from the mass through the opening, and an adjustable gate forming one side of the opening.

In witness whereof I affix my signature.

ROBERT M. CORL.